United States Patent
Weinberg et al.

(12)

(10) Patent No.: US 6,187,429 B1
(45) Date of Patent: Feb. 13, 2001

(54) DECORATIVE CERAMIC COLOR LAYERS APPLIED TO GLASS OR GLASS CERAMIC SUBSTRATES

(75) Inventors: Waldemar Weinberg; Herwig Scheidler, both of Mainz (DE)

(73) Assignee: Schott Glasswerke, Mainz (DE)

( * ) Notice: Under 35 U.S.C. 154(b), the term of this patent shall be extended for 0 days.

(21) Appl. No.: 08/348,236

(22) Filed: Nov. 28, 1994

Related U.S. Application Data

(62) Division of application No. 08/163,560, filed on Dec. 9, 1993, now abandoned.

(30) Foreign Application Priority Data

Dec. 9, 1992 (DE) .................................................. 42 41 411

(51) Int. Cl.⁷ .......................... B32B 17/06; B32B 18/00; B32B 19/04
(52) U.S. Cl. .......................... 428/324; 428/426; 428/427; 428/428; 428/432; 501/17; 501/21; 501/32; 501/144
(58) Field of Search .................................... 106/415, 417; 501/3, 17, 21, 32, 144; 428/426, 428, 432, 688, 689, 696, 702, 324, 336

(56) References Cited

U.S. PATENT DOCUMENTS

| | | | |
|---|---|---|---|
| 4,361,622 | 11/1982 | Theisen et al. | 428/363 |
| 5,022,923 | * 6/1991 | Rau | 106/415 |
| 5,032,429 | * 7/1991 | Diefenbach | 427/215 |

FOREIGN PATENT DOCUMENTS

| | | | |
|---|---|---|---|
| 650201 | * 10/1962 | (CA) | . |
| 29 45 288 | 5/1981 | (DE) | . |
| 38 35 402 | 3/1990 | (DE) | . |
| 0 364 691 | 8/1989 | (EP) | . |
| 58-45137 | * 3/1983 | (JP) | . |

OTHER PUBLICATIONS

Patent Abstracts of Japan, vol. 007, No. 131 (C–169) (Jun. 8, 1983), abstract of JP–A–58–45137.

Patent Abstracts of Japan, vol. 013, No. 095 (C–573) (Mar. 6, 1989), abstract of JP–A–63–274780.

Patent Abstracts of Japan, vol. 016, No. 040 (C–0906) (Jan. 31, 1992), abstract of JP–A–03–247534.

* cited by examiner

Primary Examiner—Ellis Robinson
(74) Attorney, Agent, or Firm—Millen, White, Zelano & Branigan

(57) ABSTRACT

For obtaining firmly adhering decorative layers of ceramic colors applied to glass or glass ceramic substrates, prior to stoving, optically inactive inorganic substances, e.g., mica, which are chemically inert with respect to the base enamel and the pigments are added to the base enamel together with the pigments in fine-particle form, e.g., 20–40 $\mu$m, in a quantity of 1–20 wt. %.

13 Claims, No Drawings

DECORATIVE CERAMIC COLOR LAYERS APPLIED TO GLASS OR GLASS CERAMIC SUBSTRATES

This application is a division of application Ser. No. 08/163,560, filed Dec. 9, 1993, now abandoned.

BACKGROUND OF THE INVENTION

The present invention concerns firmly fixed decorative ceramic color layers applied to glass or glass ceramic substrates.

Ceramic colors are often used to decorate glass and glass ceramics. They usually consist of one or several vitreous substances (base enamel or vitrification) and an admixture of one or several pigments (coloring agents). Colored inorganic oxidic compounds, e.g. spinel structures, may be used as pigments. The pigments may thereby usually not be corroded or only slightly corroded by the vitrification (dispersion coloring).

Ceramic colors are usually manufactured by mixing frits (quenched vitrifications) with the inorganic pigments. The mixing may thereby already occur during the melting process of the vitrification (fritting) or before as well as during a subsequent pulverization process of the quenched glass mass. The ceramic colors ready for use are then provided in the form of powdery mixtures of coloring agents and glass. The coloring agents consisting of metal oxides are soluble in the glass melts to a certain extent. The solubility of the coloring agents usually increases with the temperature of the glass melt.

To decorate glass or glass ceramic objects, which are usually present in finished form, the color powder is applied to the substrate to be coated in a number of ways. The powder may be present in particles with average diameters of between less 1 $\mu$m and 40 $\mu$m.

To adhere the ceramic colors before stoving, they are dispersed in highly fluid to viscous application agents, which evaporate partly during drying of the applied colors and partly during stoving. Examples of this process are mixing with screen printing oils, followed by direct or indirect screen printing (metachromotype process) or mixing with thermoplastic material and subsequent screen printing under the influence of heat. If the ceramic colors are mixed with suitable organic substances, they may be sprayed onto the substrate (spray colors).

To preserve the durability in use of the objects to be decorated, the layers applied to the substrate must be fused with the substrate by means of stoving, so as to form a solid unit. During stoving, the glass powder melts and forms a compact layer in which the coloring agent particles are firmly embedded.

If the substrate to be coated is a solid-state body, the stoving of the decoration is usually performed simultaneously with glass cooling or during glass prestressing. If the substrate is a glass ceramic, the stoving of the decoration is usually performed during the ceramization process, i.e. the decoration is applied to the green glass and stoved during ceramization. However, since the objects to be coated are already present in finished form, this means that the ceramic colors may only be stoved at temperatures at which no deformation of the pre-formed substrates can occur, i.e. the liquidity temperature of the base enamel of the ceramic color must be lower than or, at most, equal to the upper cooling temperature (annealing point) of the glass substrate. The annealing point of borosilicate glass and soda lime glass is approximately 570° C. To avoid deformations of the substrate during stoving of the base enamel, ceramic colors which are to be suitable for these glasses must fluidize at temperatures below 600° C., i.e. at a temperature of 600° C. the base enamel must display a viscosity below app. $10^2$ poise. Typical temperatures for ceramization are in the range of app. 800–950° C., so that hereby base enamels with a higher liquidity temperature may be used.

These requirements regarding the properties of the substrate and the base enamel to be used result in a further problem based on the different thermal expansion coefficients of the substrate and the coating material. If the thermal expansion coefficients of the ceramic color and the pre-formed glass or glass ceramic body deviate from each other, tensions occur in the cooled layer body. If the stoved layer has a larger thermal expansion coefficient than the coated substrate, tensile stress results in the coating material. If, however, it has a lower thermal expansion coefficient than the substrate, it is subject to compressive tensions. The scale of these tensions depends on the difference of the thermal expansion coefficients. Borosilicate glass has a thermal expansion coefficient of $\alpha=3\times10^{-6}$/K, whereas the thermal expansion coefficient of glass ceramic is $\alpha=\pm-0.2\times10^{-6}$/K.

Lead as well as lead borate glass, which is commercially available in many varieties and at economic prices and displays the required low liquidity temperatures below 600° C., is a typical base material (base enamel) for ceramic colors. Lead resp. lead borate glass, however, has thermal expansion coefficients in the range of app. $6\times10^{-6}$/K to $12\times10^{-6}$/K. The great divergence of the thermal expansion coefficients means that enormous tensile stress is present in the glass thus coated after cooling, so that cracks result, whose fissures may extend into the substrate material. The resilience to temperature differences and resistance to sudden change in temperature is also reduced in objects coated in such manner. According to the prior art, these disadvantages can only be alleviated in that the thermal expansion coefficients of the ceramic colors are adapted to the expansion coefficients of the substrates to be coated. This, however, would require ceramic colors with a high melting point, which again entails the danger that the glass or glass ceramic substrates already preformed become subject to deformation. After a certain period of time, the tensions generated by such maladjustment of the thermal expansion coefficients, however, lead to the color layer chipping off, if the maximum load of the composite arrangement is exceeded, whereby the color layer then falls off the objects resulting in chipping the object. According to the prior art, this can only be prevented in that a very thin colour layer is stoved onto the substrate, in order to keep the resultant tensions after stoving below the maximum lead. This, however, also means that the color effect (covering power, color impression) is partly very limited A further attendant disadvantage is the fact that, during stoving, such thin color layers tend to form individual domains on the substrate to be coated, so that the surface is as a whole substantially rougher than in the case of an even color coat. As a result, important working properties such as chemical resistance to acids or alkalis during cleaning or abrasive behavior are considerably impaired. Likewise, the radiance of rough surfaces is substantially lower than that of even surfaces. A further disadvantage which rendered the coating of, in particular borosilicate, glass with colors of, in particular non-lead, base enamel difficult was the fact that such non-lead colors are very brittle, due to their lower elasticity compared to lead base enamels, and therefore displayed reduced adhesion to the substrate and did not permit application of the layer thickness required to generate the attractive color impression of a decorative layer to be created with the ceramic colors.

SUMMARY OF THE INVENTION

The present invention therefore proceeds from the problem of providing decorative layers consisting of ceramic colors with both lead and non-lead base enamel, which can be stoved onto glass and glass ceramic substrates by conventional methods in a layer thickness required for color-intensive, firmly adhesive and even coating, so as to reduce or eliminate the deterioration of the working properties described above, and to provide a process for manufacturing substrates coated with ceramic colors from pre-formed glass or glass ceramic bodies, in particular also for coating borosilicate glasses and glass ceramics with non-lead ceramic colors.

With regard to the decorative layers, the problem is solved by providing firmly adhering decorative ceramic color layers consisting of base enamel and pigments and applied to glass or glass ceramic substrates, characterized in that they contain chemically inert, optically inactive, elastic inorganic substances unaffected by temperature, in the form of fibers, threads, flakes or globulites, evenly distributed across the volume of the decorative layer in a quantity range of 1–20 weight-%.

For producing these layers, there is provided a process for coating glass or ceramic glass substrates with ceramic colors in a layer thickness required for even coating, whereby the ceramic colors are applied to the substrate according to processes known per se by means of metachromotyping, screenprinting or spraying and are stoved in a subsequent tempering process, characterized in that chemically inert, optically inactive, elastic inorganic substances are admixed to the base enamel together with the pigments prior to stoving, in the form of fibers, threads, flakes or globulites in a quantity of 1–20 weight-%.

Upon further study of the specification and appended claims, further features, objects and advantages of this invention will become apparent to those skilled in the art.

It was surprisingly found that, if 1–20 weight-% of fine-particle inorganic substances are added to the base enamel, tear as well as crack formation does not occur in the cooled layer body, despite the continued existence of great differences in the expansion coefficients of the coating and the substrate. The fine-particle inorganic substances may be added in the form of fibers, threads, flakes or globulites. In particular, these materials should still display a degree of elasticity. By admixing these substances to the base enamel, the other properties of the composite arrangement of ceramic color and substrate were not impaired.

The addition of mica flakes, preferably in sizes of 20–40 $\mu$m diameter, proved to be particularly advantageous. In terms of its chemical nature, mica is an alumina silicate containing alkali and/or fluorine with additions of potassium, sodium, lithium, calcium, iron and/or magnesium. According to the invention, commercially available raw materials such as Muskovit (K—Al mica), Biotit (K—Mg, $Fe^{2+}$ mica), Phlogopit (K—Mg mica), Zinnwaldit (K—Li, $Fe^{2+}$, Al mica), Paragonit (Na—Al mica) as well as the family of hydro mica (Hydroparagonit, Hydromuskovit, et al.) and brittle mica (with Ca; Al: Si=2:2, such as Margarit $CaAl_2$ $(OH)$ 2 $(Al_2Si_2O_{10})$ and the like) may be used.

Mica can absorb different amounts of water, which is emitted again during heating. For example, if ceramic colors with base enamel melting points above 900° C. are used for coating, it is necessary to first temper the mica flakes at 900° C. for several hours to extract the water from them. Otherwise reactions would occur as a result of the dehydration reaction and the change in the crystal phase, which would alter the working properties of the stoved color.

Mica flakes may principally also be added in contents above 20 weight-%, but they then hardly contribute to the improvment of the properties. On the other hand, excessive mica flake contents may also impair the surface quality of the applied layer during stoving.

The mica flakes are advantageously added together with the pigments, i.e. during the melting process of the vitrifications or during the grinding process of the quenched vitrifications.

The application of the color powder thus obtained may occur by the known processes according to the prior art (metachromotype, screen printing, spray color process et al.). The ceramic colors thus strengthened with inorganic additives may be applied and stoved onto any glass-type carrier, in particular onto soda lime glass (floatglass), borosilicate glass (flat and/or hollow glass) as well as glass ceramic. Typical layer thicknesses which may be applied to glass ceramics are in the range of 4–5 $\mu$m. This is approximately twice the layer thickness which could until now be firmly adhered to glass ceramics according to the prior art. The layer thicknesses of the ceramic colors which may be applied to lime soda glass, as well as borosilicate glass is in the range of 10–15 $\mu$m. In particular non-lead colors may thus also be firmly fixed to borosilicate glass, which was not possible according to the prior art due to the great brittleness of non-lead colors. By adding such inorganic substances, a firmly fixed penetration by fusion can be realized without deformation of the substrate glass.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents, and publications, cited above and below, and of corresponding German Application P 42 41 411.3–45, filed Dec. 9, 1992 (published Jun. 16, 1994), are hereby incorporated by reference.

EXAMPLES

The invention is now described in detail by reference to typical exemplary embodiments:

The layer bodies obtained were tested by the following test parameters:

1. A strip of transparent adhesive film (Tesafilm Typ 104, Beiersdorf company) is applied to the stoved decorative layer. The strip is firmly rubbed on and then abruptly ripped off. It is then examined whether particles of coating adhere to the film.
2. Glass eraser: a rubber mixture mixed with finely grained silicon carbide (grain size below 100 $\mu$m) is formed into bars of 3 cm edge length. This abrasive object is rubbed over the decorative color at least twenty times with light pressure. The decorative color is then inspected for visible abrasion.

Example 1

A ceramic color (e.g. Farbserie NP 2000, Degussa company) consisting of a non-lead base enamel and pigments was applied to a pre-formed substrate of borosilicate glass with an upper cooling temperature of 560° C. in a layer of app. 30 $\mu$m thickness by a metachromotype process.

The stoving process was carried out as follows:

Heating phase up to stoving temperature with a temperature gradient of 120° C./min;

Stoving at a temperature of app. 600° C. for a period of 3 min;

Cooling to room temperature with a temperature gradient of 12° C./min.

The break test with the adhesive film showed the following result:

The color was torn off the base almost across the entire adhesion surface, whereby a large number of rough particles adhered to the adhesive film.

After rubbing twenty times with the glass eraser, clear abrasion traces were observable on the stoved layer.

Example 2

Five weight-% mica flakes (type: Muskovit) were added to the ground, quenched vitrification of the ceramic color according to Example 1. The color powder mixture thus obtained was suspended in a screen-printing oil (80816, Degussa company) and applied to the substrate made of borosilicate glass according to Example 1 in a layer of app. 30 μm thickness by means of screenprinting. The stoving process was carried out with a temperature gradient according to Example 1 at app. 600° C. for a period of 3 min.

The break test with the adhesive film showed the following result:

The layer as a whole proved to adhere firmly. No particles or at the most very few small particles could be torn off.

The abrasion test with the glass eraser showed the following result after rubbing twenty times:

No clear abrasion traces were observable.

After stoving, the decorative coating had a layer thickness of app. 12 μm.

Example 3

A ceramic color consisting of base enamel and pigments was applied in a layer of app. 15 μm to a green glass by means of metachromotyping. The base enamel had the following composition:

| | Weight-% | | Weight-% |
|---|---|---|---|
| $Al_2O_3$ | 3.14 | $MnO_2$ | 0.09 |
| $B_2O_3$ | 4.14 | $Na_2O$ | 2.95 |
| CoO | 0.05 | PbO | 44.20 |
| $Co_2O_3$ | 6.82 | $Sb_2O_3$ | 1.89 |
| $Fe_2O_3$ | 5.1 | $SiO_2$ | 24.30 |
| $K_2O$ | 0.65 | $TiO_2$ | 0.3 |
| $Li_2O$ | 0.01 | ZnO | 4.14 |
| | | $ZrO_2$ | 0.05 |

The coated green glass was subjected to a ceramization process described in the literature (e.g. in the DE-PS 37 14 970, (published Nov. 17, 1988) or the GB-A 1,424,526 (published Feb. 11, 1976)). The ceramization occurred in the temperature range of 800–950° C.

After stoving during ceramization, the ceramic color displayed a layer thickness of app. 5 μm.

The break test with the adhesive film showed the following result:

A relatively large number of rough particles adhered to the adhesive film.

Example 4

Five weight-% mica flakes (type: Muskovit) as described in Example 2 were added to the ceramic color according to Example 3. The color powder mixture obtained was applied to the green glass according to Example 3 by means of the process described there. After stoving during ceramization according to Example 3, the ceramic color displayed a layer thickness of 5 μm.

The break test with the adhesive film showed the following result:

The layer proved to adhere firmly for practical use. Larger particles could not be torn off, at best only very tiny ones.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A colored substrate composition comprising:

a glass or a glass ceramic substrate and at least one decorative ceramic color layer applied thereto, wherein said ceramic color layer comprises at least one pigment, at least one glass and uncoated mica flakes, said uncoated mica flakes being present in said ceramic color layer in an amount of 1–20 wt. %.

2. A composition according to claim 1, wherein said uncoated mica flakes are uncoated flakes of muskovit, biotit, phlogopit, zinnwaldit, paragonit, hydroparagonit, hydromuskovit or margarit.

3. A composition according to claim 1, wherein said at least one pigment is a metal oxide.

4. A composition according to claim 1, wherein said substrate is a soda lime glass.

5. A composition according to claim 1, wherein said substrate is a borosilicate glass.

6. A composition according to claim 1, wherein said substrate is a glass ceramic.

7. A composition according to claim 1, wherein said at least one glass of said ceramic color layer is a plumbic or lead borate glass.

8. A composition according to claim 1, wherein said at least one glass of said ceramic color layer is a non-plumbic glass.

9. A composition according to claim 1, wherein the thickness of said ceramic color layer is 10–15 μm.

10. A composition according to claim 1, wherein the thickness of said ceramic color layer is 4–5 μm.

11. A composition according to claim 1, wherein said uncoated mica flakes have a diameter of 20–40 μm.

12. A composition according to claim 1, wherein said uncoated mica flakes are uncoated mica flakes tempered at 900° C.

13. A colored substrate composition comprising:

a glass or glass ceramic color substrate, and at least one decorative ceramic layer applied thereto, wherein said ceramic color layer comprises at least one pigment, at least one glass and a chemically inert, elastic inorganic substance and said elastic inorganic substance consists of mica flakes in an amount of 1–20 wt. %.

* * * * *